United States Patent [19]

Satoh et al.

[11] Patent Number: 5,309,762
[45] Date of Patent: May 10, 1994

[54] MASS FLOWMETER WITH HERMETICALLY SEALED HOUSING

[75] Inventors: Kiyoshi Satoh; Noriyuki Kimura, both of Miyanohigashi, Japan

[73] Assignee: Stec Inc., Kyoto, Japan

[21] Appl. No.: 615,069

[22] Filed: Nov. 19, 1990

[30] Foreign Application Priority Data

Nov. 27, 1989 [JP] Japan .................. 1-307897

[51] Int. Cl.⁵ .................................. G01F 1/68
[52] U.S. Cl. .......................... 73/204.22; 73/202.5
[58] Field of Search ............. 73/202, 202.5, 204.12, 73/204.22, 204.23, 204.25, 204.27

[56] References Cited

U.S. PATENT DOCUMENTS

| | | | |
|---|---|---|---|
| 2,594,618 | 4/1992 | Booth, Jr. ............... | 73/204.12 |
| 3,187,569 | 6/1965 | Los ........................... | 73/204.12 X |
| 3,827,299 | 8/1974 | Welland .................. | 73/204.12 |
| 4,487,062 | 12/1984 | Olin et al. ............... | 73/202.5 |
| 4,548,075 | 10/1985 | Mariano .................. | 73/202.5 |
| 4,921,005 | 5/1990 | Ohmi et al. ............. | 73/204.25 X |
| 4,949,578 | 8/1990 | Harpster .................. | 73/202.5 |

FOREIGN PATENT DOCUMENTS 428216 5/1975 U.S.S.R. ............... 73/204.22

*Primary Examiner*—Herbert Goldstein
*Attorney, Agent, or Firm*—Price, Gess & Ubell

[57] ABSTRACT

A mass flow meter includes a housing body having a fluid passageway extending therethrough with a capillary tube communicating with the fluid passageway. The capillary tube is connected through a pair of metallic sleeves mounted on a base member which in turn is fastened to the housing body. A pair of sensor coils is connected to the capillary tube to measure any fluid flow. A metal sensor case is welded airtight to the base member to encapsulate the capillary tube.

6 Claims, 4 Drawing Sheets

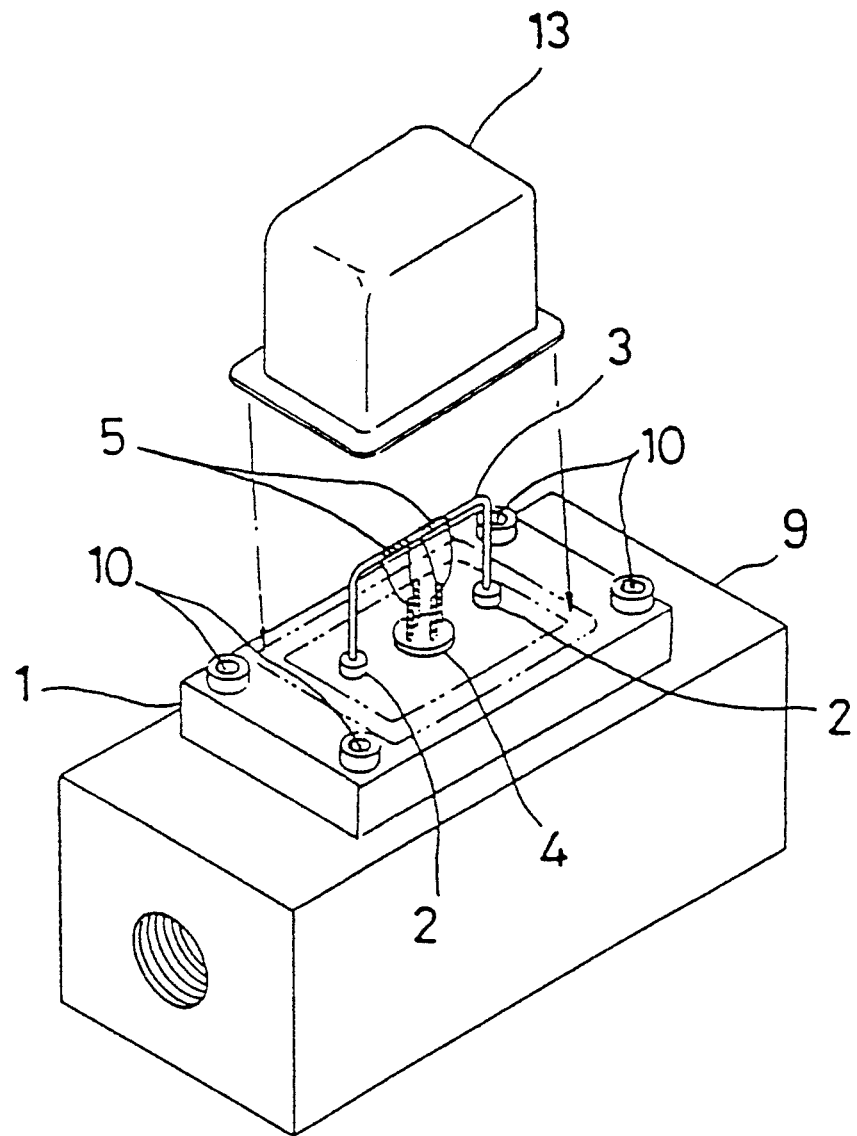

MASS FLOWMETER WITH HERMETICALLY SEALED HOUSING

BACKGROUND OF THE INVENTION

1. Field of the Invention

The present invention relates to an improved mass flowmeter.

2. Description of the Prior Art

The conventional general mass flowmeter comprises a body block provided with a fluid passage formed therewithin, a sensor case made of resins or metals projected from said body block, a metallic capillary tube (having an outside diameter of for example about 0.6 mm and an inside diameter of for example about 0.4 mm) provided within said sensor case as a measuring passage, a pair of sensor coils wound around said capillary tube and a lead wire or a lead rod mounted on the body block for leading an electric current to said sensor coils.

However, the above described sensor case has generally attempted to isolate the sensor coil provided therewithin from the air or electro-magnetic waves, so that the sensor case, the body block and the lead wire or the lead rod and the body block have been sealed up with resinous adhesives or resinous materials.

However, according to the above described sealing-up method using resinous adhesives or resinous materials, the sensor case, the body block and the lead wire or the lead rod and the body block have been unable to be perfectly cut off from the air, so that a slight quantity of moisture has gradually entered into the inside of the sensor case from the air and thus may badly influence a highly accurate measurement according to circumstances.

In addition, even though an inert gas (for example nitrogen gas) is enveloped in said inside of the sensor case during the production, the sensor case, the body block and the lead wire or the lead rod and the body block can not be perfectly cut off from the air, so that a slight quantity of moisture gradually enters the inside of the sensor case to reduce the accuracy of measurement and thus deteriorate the sensor.

Furthermore, usually a thin-walled capillary tube having a wall-thickness of 0.1 mm or less is used as said metallic capillary tube serving as a measuring passage, so that, in the case where a fluid flowing through said measuring passage is a highly corrosive fluid (for example HF, HCl and the like), there is also the possibility that said corrosive fluid is leaked outside from the sensor case due to a corrosion of a wall of the capillary tube.

Besides, the above described problem has the possibility of similarly occurring also in the sealing-up method of the lead wire or lead rod used as a terminal for introducing an electric current into the sensor coil.

SUMMARY OF THE INVENTION

The present invention has been achieved paying attention to the above described matters and it is an object of the present invention to provide a mass flowmeter not only capable of completely isolating sensor coils or a metallic capillary tube within a sensor case from the air and conducting a highly accurate measurement for a long time but also having a safety feature.

In order to achieve the above described object, a mass flowmeter according to the present invention is characterized in that a sensor case is welded to a block body so that an inside space thereof may be sealed up, hermetic seal terminals being used as terminals for introducing an electric current into sensor coils, and said hermetic seal terminals being welded to said block body.

According to the above described characteristic construction, said sensor coils provided within said sensor case can be isolated from the air, so that a deterioration of the sensor coils or a reduction of accuracy of measurement due to an intrusion of moisture from the air can be prevented.

In addition, even though said metallic capillary tube is corroded with a corrosive fluid and said fluid is leaked out, said inside of the sensor case is cut off from the air, so that the fluid is not leaked out in the air and thus the safety is improved.

BRIEF DESCRIPTION OF THE DRAWINGS

One preferred embodiment of the present invention is shown in FIGS. 1 to 4, in which

FIG. 2 is a whole perspective view showing the mass flowmeter shown in FIG. 1;

DESCRIPTION OF THE PREFERRED EMBODIMENT

A preferred embodiment of the present invention will be below described with reference to the drawings.

Figure 1:
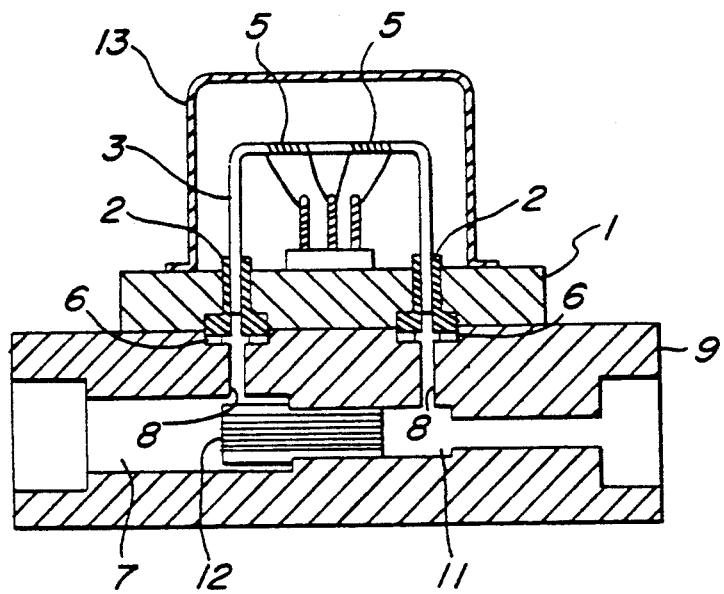
FIG. 1 is a partial cross-sectional view of the case and base.
Figure 3A:
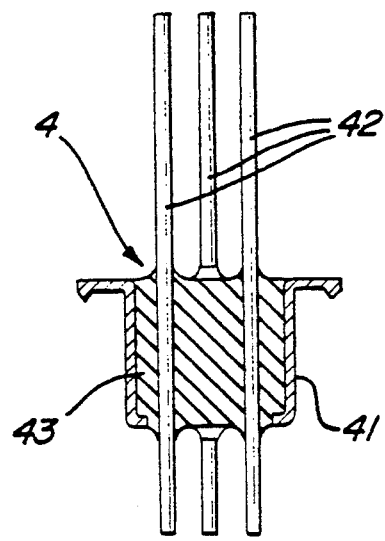
FIG. 3(A), (B) shows one example of a hermetic seal terminal, FIG. 3(A) being a longitudinal sectional view, and FIG. 3(B) being a plan view.
Figure 3B:
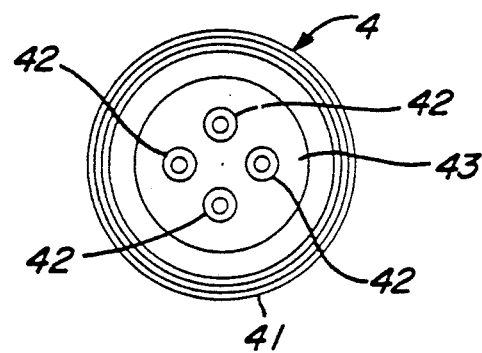
Figure 4:
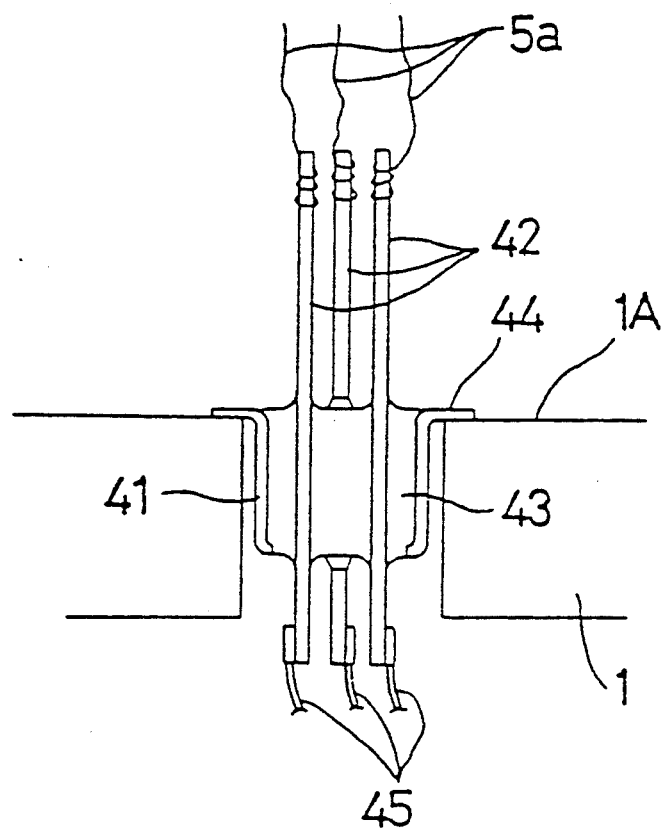
FIG. 4 is a longitudinal sectional view showing a state of mounting the hermetic seal terminal on a fixed base.

Referring now to FIGS. 1, 2 showing one preferred embodiment of a mass flowmeter according to the present invention, reference numeral 1 designates a metallic sensor-fixing base provided with metallic sleeves 2, 2, a U letter-like shaped metallic capillary tube 3 being connected with said sensor-fixing base 1 through said metallic sleeves 2, 2 by resistance welding and the like so that it may be arranged under an inverse U letter condition. In addition, a hermetic seal terminal 4 is fixedly mounted on an upper surface of the sensor-fixing base 1. That is to say, said hermetic seal terminal 4 comprises for example four pieces of lead pin 42 arranged within a metallic case 41 at suitable intervals and sealed up with glass 43, as shown in FIG. 3(A), (B). And, as shown in FIG. 4, such the hermetic seal terminal 4 is fixedly mounted on said upper surface 1A of the sensor-fixing base 1 by the resistance welding, that is by putting a resistance welding portion 44 thereof on the upper surface 1A of the sensor-fixing base 1 and flowing an appointed electric current between said resistance welding portion 44 and the sensor-fixing base 1.

And, end portions 5a of two sensor coils 5 wound around capillary tube 3 are connected with upper ends of said lead pins 42 by the soldering or the resistance welding and lead wires 45 connected with a bridge circuit (not shown) are connected with lower ends of the lead pins 42 by the soldering or the resistance welding. In short, said sensor coils 5 are connected with said bridge circuit through the lead pins 42 of the hermetic seal terminal 4.

In addition, the hermetic seal terminal 4 may be sealed up with ceramics.

Subsequently, the sensor-fixing base 1 provided with said capillary tube 3 connected therewith is placed on a metallic body block 9 provided with a fluid passage 7 formed therewithin and openings 8, 8 formed on the side of upper surface thereof to be fixedly mounted on said body block 9 by means of bolts 10, 10 (refer to FIG. 2).

In addition, referring to FIG. 1, reference numerals 6, 6 designate metallic sealing members, reference numeral 11 designating a by-pass passage, which is provided within the body block 9, for a measuring passage formed of the capillary tube 3, and reference numeral 12 designating a by-pass element having constant-flow rate characteristics provided in said by-pass passage 11.

Figure 1A:
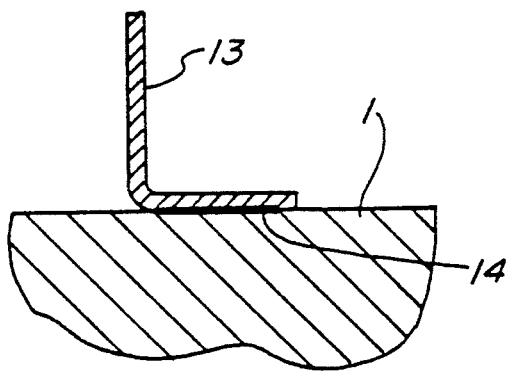
FIG. 1A is an enlarged partial cross-sectional view of the case and base.

After the sensor-fixing base 1 was fixedly mounted on the body block 9, a metallic sensor case 13 for covering the capillary tube 3 is placed on the upper surface of the sensor-fixing base 1 so as to be engaged with a portion shown by a broken line of the upper surface of the sensor-fixing base 1 in FIG. 2 to be fixedly mounted on the sensor-fixing base 1 by the resistance welding, that is by flowing an appointed electric current between said sensor case 13 and the sensor-fixing base 1 (refer to an enlarged view in FIG. 1A).

Furthermore, reference numeral 14 shown in said enlarged view in FIG. 1A designates a resistance welding portion.

And, according to the above described preferred embodiment, since all the sensor-fixing base 1, the capillary tube 3, the sensor case 13 and the like can be formed of a single metallic material, it is sufficient to suitably select a metal, such as stainless steel, nickel and Cobal, superior in corrosion resistance. In addition, although the capillary tube 3 and the hermetic seal terminal 4 are connected with the sensor-fixing base 1 in the form of the block body in the above described preferred embodiment, they may be directly connected with the block body 9.

Furthermore, although the resistance welding is used as the welding method in the above described preferred embodiment, it goes without saying that the welding method is not limited by the resistance welding.

As above described, according to the present invention, the sensor case and the hermetic seal terminal are welded to the block body (sensor-fixing base), so that the sensor coils provided within the sensor case can be perfectly cut off from the air and thus a deterioration of the sensor coils or a reduction of accuracy of measurement due to an intrusion of moisture from the air can be prevented.

In addition, since all the block body, the capillary tubes, the sensor case and the like can be formed of said single metallic material superior in corrosion resistance, the mass flowmeter having a long useful life time can be obtained.

Furthermore, even though the metallic capillary tube is corroded with the corrosive fluid and the fluid is leaked out, the inside of the sensor case is cut off from the air, so that the fluid is not leaked out in the air and thus the safety is improved.

Besides, as to the case where the corrosive fluid is leaked out in the air due to the corrosion of the sensor case, the sensor coils are damaged prior to the leakage of the corrosive fluid, the bridge circuit, with which the sensor coils are connected, becoming abnormal in output, and the abnormality being able to be electrically detected, so that the leakage of the corrosive fluid can be previously prevented.

What is claimed is:

1. An improved mass flowmeter assembly for measuring a fluidic flow comprising:
   a housing body having a fluid passageway extending therethrough;
   a capillary tube;
   means on the housing body for providing a conduit from and to the fluid passageway for operative connection with the capillary tube;
   a base member mounted on the housing body;
   a pair of metallic sleeves mounted on the base member and welded respectively to each end of the capillary tube;
   means for measuring fluid flow through the capillary tube including a pair of sensor coils connected to the capillary tube, and
   a metal sensor case having a peripheral flange welded airtight to the base member to encapsulate the capillary tube.

2. The mass flowmeter assembly of claim 1 further including an aperture in the base member and means for electrically connecting the sensor coils, including a hermetically sealed terminal member mounted in the aperture of the base member and welded airtight about the aperture.

3. The mass flowmeter assembly of claim 2 wherein the hermetically sealed terminal member includes a metallic case with an outer peripheral flange and a hollow center, electrical lead pins extend through the metallic case, and glass mounts the electrical lead pins in the hollow center for sealing the interior of the metallic case.

4. The mass flowmeter assembly of claim 1 wherein each of the metallic sleeves includes an enlarged lower base and an extended elongated sleeve, and the base member is a flat plate that includes respective cavities on a lower surface of the plate for receiving the enlarged bases and respective conduits to enable the elongated sleeves to extend through the base member for receiving the capillary tube adjacent an upper surface of the flat plate.

5. An improved mass flowmeter assembly for measuring a fluidic flow comprising:
   a housing body having a fluid passageway extending therethrough;
   a stainless steel capillary tube;
   means on the housing body for providing a conduit from and to the fluid passageway for operative connection with the capillary tube;
   a base member mounted on the housing body having a central aperture and a pair of indented cavities on a lower surface, and conduits extending from the cavities to an upper surface of the base member;
   a pair of metallic sleeve members, each including an enlarged lower base and an extended elongated sleeve, the enlarged lower bases being mounted in the indented cavities, and the elongated sleeves extending through the base member for attaching the capillary tube by welding adjacent the upper surface of the base member;
   means for measuring fluid flow through the capillary tube, including a pair of sensor coils wound around the capillary tube;
   a hermetically sealed terminal member, mounted in the central aperture of the base member, including a metallic case with an outer peripheral flange and a hollow center, electrical lead pins extending through the metallic case and glass mounting the electrical lead pins in the hollow center and sealing the interior of the metallic case, the peripheral flange being welded to the base member, and a metal sensor case having a peripheral flange welded airtight to the base member to encapsulate the capillary tube.

6. An improved mass flowmeter assembly for measuring a fluidic flow comprising:

a housing body having a fluid passageway extending therethrough;

a capillary tube;

means on the housing body for providing a conduit from and to the fluid passageway for operative connection with the capillary tube, including a pair of indented depressions with a respective sealing member in each depression;

a base member mounted on the housing body having a central aperture and a pair of indented cavities on a lower surface, and conduits extending from the cavities to an upper surface of the base member;

a pair of metallic sleeve members, each including an enlarged lower base and an extended elongated sleeve, the enlarged lower bases being mounted in the indented cavities and extending into the housing body depressions for contact with the sealing members, and the elongated sleeves extending through the base member and attached to the capillary tube adjacent the upper surface of the base member;

means for measuring fluid flow through the capillary tube, including a pair of sensor coils wound around the capillary tube;

a hermetically sealed terminal member, mounted in the central aperture of the base member, including a metallic case with an outer peripheral flange and a hollow center, electrical lead pins extending through the metallic case and insulation material mounting the electrical lead pins in the hollow center and sealing the interior of the metallic case, the peripheral flange being welded to the base member, and a metal sensor case having a peripheral flange welded airtight to the base member to encapsulate the capillary tube.

* * * * *